United States Patent
Hafermalz

[19]

[11] Patent Number: 6,161,465
[45] Date of Patent: Dec. 19, 2000

[54] PNEUMATIC OR HYDRAULIC CONTROL MOTOR WITH A SHUTOFF DEVICE

[75] Inventor: Jens-Uwe Hafermalz, Waldstetten, Germany

[73] Assignee: ZF Friedrichshafen AG, Friedrichshafen, Germany

[21] Appl. No.: 09/297,677

[22] PCT Filed: Nov. 11, 1997

[86] PCT No.: PCT/EP97/06270

§ 371 Date: May 6, 1999

§ 102(e) Date: May 6, 1999

[87] PCT Pub. No.: WO98/22718

PCT Pub. Date: May 28, 1998

[30] Foreign Application Priority Data

Nov. 16, 1996 [DE] Germany .......................... 196 47 472

[51] Int. Cl.$^7$ .................................................. F15B 15/20
[52] U.S. Cl. ................................................. 91/401; 91/422
[58] Field of Search ............................. 91/400, 401, 404, 91/403, 422

[56] References Cited

U.S. PATENT DOCUMENTS

| | | | |
|---|---|---|---|
| 2,703,558 | 3/1955 | Wilcox | 91/416 |
| 2,895,455 | 7/1959 | Clowers | 91/422 X |
| 3,568,570 | 3/1971 | Winders | 92/422 X |
| 3,654,834 | 4/1972 | Sifri et al. | 91/401 X |

FOREIGN PATENT DOCUMENTS

| | | |
|---|---|---|
| 30 13 381 | 10/1981 | Germany . |
| 35 34 577 | 5/1987 | Germany . |
| 39 23 512 | 1/1991 | Germany . |
| 40 03 047 | 8/1991 | Germany . |
| 91 11 009 | 2/1993 | Germany . |
| 41 39 085 | 6/1993 | Germany . |
| 42 21 459 | 1/1994 | Germany . |

*Primary Examiner*—John E. Ryznic
*Attorney, Agent, or Firm*—Larson & Taylor

[57] ABSTRACT

A hydraulic shutoff device in the end positions of a servo cylinder is provided to prevent direct hard contact between the working piston (31) and the limit stops (47, 48) under working pressure and to enable withdrawal from end positions with hydraulic assistance. Idler pistons (32, 33) with limited displaceability are located on the working piston (31) and act as a seal, fitting tightly against the sealing edges (34, 35) of the working piston. The sealing edges (34, 35) control a bypass channel (36) located in the working piston (31). A spring (41) is inserted between the idler pistons (32, 33) in a chamber (40) which can be pressurized. When the working piston (31) comes into contact, for instance, with the limit stop (48) of the bush (43), the collar (45) knocks one idler piston (33) away from the sealing edge (35). Junction with the chamber (40) occurs through the bypass channel (36), whereupon the working pressure pushes the idler piston (32) back against the spring (41) away from its sealing edge (34). The working pressure can then drop between the pressurized pressure chamber (37) and the pressure chamber (38) until the spring (41) seals the idler piston (33) against the sealing edge (34) once again. The pressure which is thus adjusted in the pressure chamber (37) holds the working piston (31) together with the idler piston (32, 33) in the end position. The pressure thus adjusted is, however, below its maximum value.

8 Claims, 3 Drawing Sheets

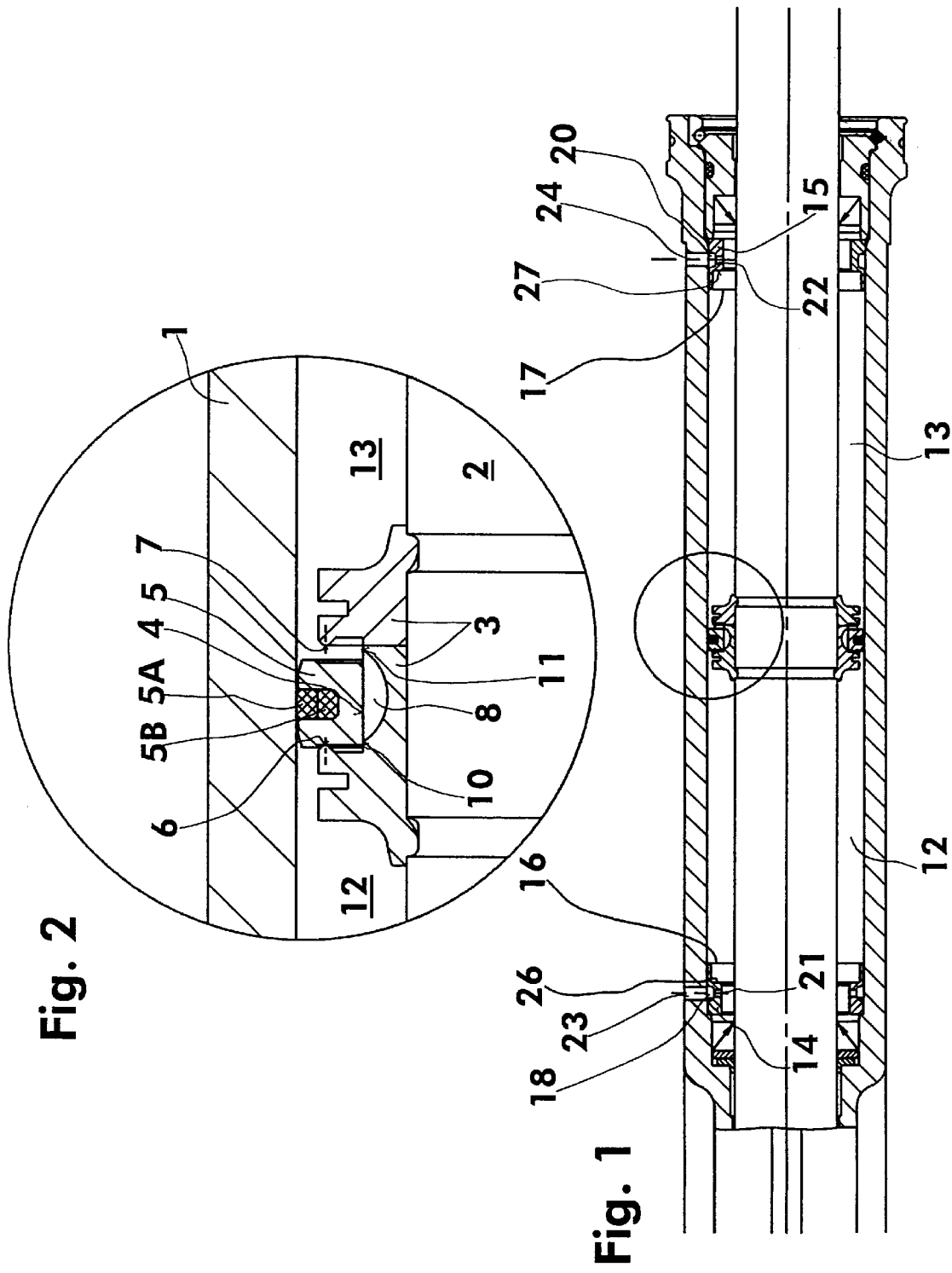

PNEUMATIC OR HYDRAULIC CONTROL MOTOR WITH A SHUTOFF DEVICE

FIELD OF THE INVENTION

The invention relates to a pneumatic or hydraulic control motor, in which a shutoff device is provided in the end positions of a working piston. In the present version, the invention pertains to a power-assisted steering system, in particular for motor vehicles with a compressed air pump, a steering valve, and a servomotor.

Such shutoff devices are intended to prevent the hard impact of the working piston against the limit stops, because such impacts cause noise. When the working piston meets the limit stops, the pump pressure rises impermissibly to a maximum value, so that the built-in overpressure valve responds. If the steering valve remains deflected for a relatively long time in this operating state, the pump can be damaged by thermal overload.

BACKGROUND OF THE INVENTION

A shutoff device for a power-assisted steering system is known for instance from German Patent Disclosure DE 42 21 459. Here, in an end position of the working piston, which is at high pressure, the pressurized pressure chamber communicates with the pressure chamber that is subject to return pressure. The hydraulic oil can therefore drop in pressure and flow out via the pressure connection of the inactive pressure side. This relief course in the end positions of the servomotor proceeds via a longitudinal groove in the inner wall of the servo cylinder that comes to communicate with the pressure connection. This communication in the end positions is established by having the working piston overtake the longitudinal groove. On steering back into the other direction, however, such a shutoff device is initially incapable of building up any pressure, since the working piston must first cover a short distance before it can close the longitudinal groove. During this time, no servo force is available, and the driver must bring all the steering force to bear manually.

From French Patent Disclosure FR-A 1 125 999, another control motor with a shutoff device for a working piston is known in which a movable ball and spring unit is inserted into the working piston. A ball seals off a bypass channel around whichever pressure chamber is relieved at the time at a sealing edge of the working piston. By contact with a protruding edge in the two end positions of the servo cylinder, a respective ball is forced away from the associated sealing edge, so that the two pressure chambers enter into communication. With this arrangement, however, only a bypass channel with a very small flow cross section can be opened. Another control motor with a shutoff device is known from U.S. Pat. No. 4,860,646, As disclosed a small control piston protruding to both sides is disposed in the working piston, and by means of the control piston, a relatively narrow bypass channel is opened when the working piston arrives at the end wall of the cylinder.

BRIEF SUMMARY OF THE INVENTION

The object of the invention is to adapt the shutoff device in such a way that at the very onset of steering back out of one end position, the servo force is available. The power-assisted steering system is intended to meet this demand with the least possible engineering effort and expense.

This object is attained by the power-assisted steering system discussed hereafter where at least one idler piston with limited displaceability is disposed on the working piston and with its face ends seals off a bypass channel from the respective relieved pressure chamber of the servomotor. There is also a bush with a recessed collar located in the two end positions of the servo cylinder; the collar presses the displaceable idler piston away from its one sealing edge while the other sealing edge is opened, so that the two pressure chambers are made to communicate. The idler piston is embodied annularly and as a result can open a relatively large annular flow cross section. If when steering back in the other direction the working pressure flows into the previously relieved pressure chamber, the idler piston moves toward the other sealing edge and seals off the new pressure chamber; the oil flow can be regulated via a control edge. In this way, steering back again from the end positions can be done with hydraulic support. The regulating control edges have the object here of assuring soft contact of the idler piston with the sealing edges. If there is no need for a soft contact, the control edges can be omitted.

One advantageous embodiment with two idler pistons is described hereafter. In this embodiment, a further idler piston of limited displaceability is located on the working piston, and each idler piston, with its outer face end, seals off the bypass channel. A spring is inserted into a pressurizable chamber between the idler pistons. This embodiment is distinguished by the capability of averting noise caused by the shutoff device. The other to expedient features of the invention are also described hereafter.

BRIEF DESCRIPTION OF THE DRAWINGS

The invention is described in further detail in two exemplary embodiments, taking a hydraulic power-assisted steering system as an example.

Shown are:

FIG. 1, the servo cylinder of a power-assisted steering system, in section, with the shutoff device of the invention;

FIG. 2, an enlarged detail of the working piston of FIG. 1;

DESCRIPTION OF THE PREFERRED EMBODIMENTS

Figure 3:
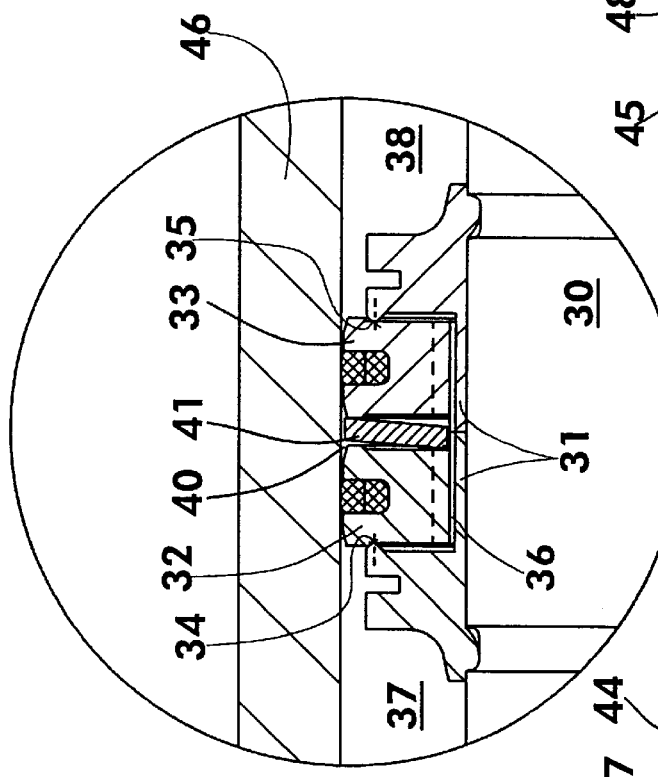
FIG. 3, a further embodiment with two idler pistons.

A working piston 3 solidly connected to a piston rod 2 is supported in a cylindrical tube 1. A rack, not shown, adjoins the piston rod 2 in aligned fashion. The working piston 3 is secured to the piston rod 2 in form-locking manner by rolling or kneading. The split working piston 3 includes a groove 4, in which an idler piston 5 with sealing rings 5A, 5B is inserted so as to be axially displaceable. With sealing edges 6 or 7 on one of the end faces of the idler piston 5, the working piston 3 seals off a bypass channel 8. The bypass channel 8 is machined in the form of one or more longitudinal grooves or as an annular gap in the working piston 3 or in the idler piston 5. The idler piston 5 on the, working piston 3, with either a control edge 10 or a control edge 11, regulates the oil flow in the bypass channel 8. The idler piston 5 and the working piston 3 divide the cylindrical tube 1 into two pressure chambers 12 and 13.

On each of the ends of the cylindrical tube 1 is a built-in bush 14 and 15, respectively, with a respective offset collar 16 and 17 and a limit stop 26, 27. The bush 14, 15 also has the task, via an annular groove 18, 20 and a bore 21, 22, of establishing a communication from the oil connection 23, 24 into the pressure chamber 12 or 13.

When the working piston 3 is pressed by the working pressure, for instance in the pressure chamber 12, in the direction of the right-hand end position, the idler piston 5 is in the sealing position at the sealing edge 7. The idler piston 5 then covers the control edge 11, while the control edge 10 is open. The working pressure in the pre sure chamber 12 cannot be relieved to the pressure chamber 13 through the closed sealing edge 7. The working piston 3 with the idler piston 5 moves as far as the bush 15. At the limit stop, the collar 17 of the bush 15 strikes against the idler piston 5 and displaces it into a middle position, in which the sealing edge 7 and the control edge 11 are opened. This middle position of the idler piston 5 is determined by the contact of the working piston 3 with the limit stop 27 of the bush 15. The working pressure in the pressure chamber 12 thereupon drops via the pressure chamber 13 and the oil connection 24 to an oil container, not shown. The returning oil flowing past the sealing edge 6 virtually without pressure keeps the idler piston 5 in the opened position at the collar 17.

If steering is to be done back again out of this right-hand end position, then the steering valve is adjusted in the opposite direction by turning the steering wheel. The working pressure thereupon flows via the oil connection 24 into the pressure chamber 13, and the idler piston 5 is pressed against the sealing edge 6. The working piston 3 thereupon moves to the left, together with the idler piston 5. By means of the additional control edges 10 and 11, the closing motion of the idler piston 5 can be controlled so that it will meet its sealing edges 6 or 7 in damped fashion. With the power-assisted steering system of the invention, steering back out of the end positions can be done with servo force after the idler piston 5 has been displaced against the sealing edge 6 or 7.

Figure 5:
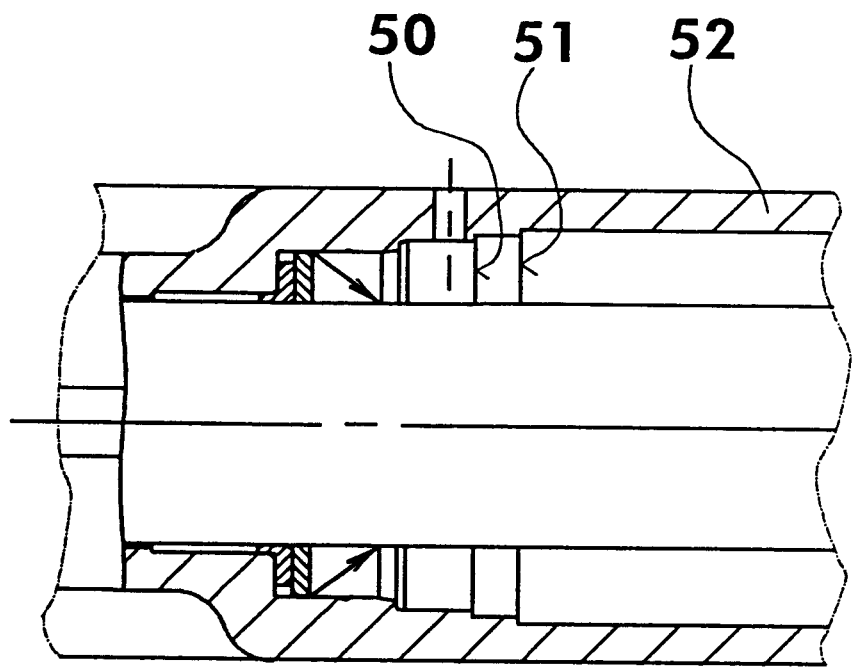
FIG. 5, an enlarged detail of an embodiment of a limit stop.

In FIG. 5, the limit stop 50 and the collar 51 can also be mounted directly in a cylindrical tube 52. However, the right-hand side of the cylindrical tube must be embodied as a loose bush, so that the working piston with the idler piston can be installed.

Figure 4:
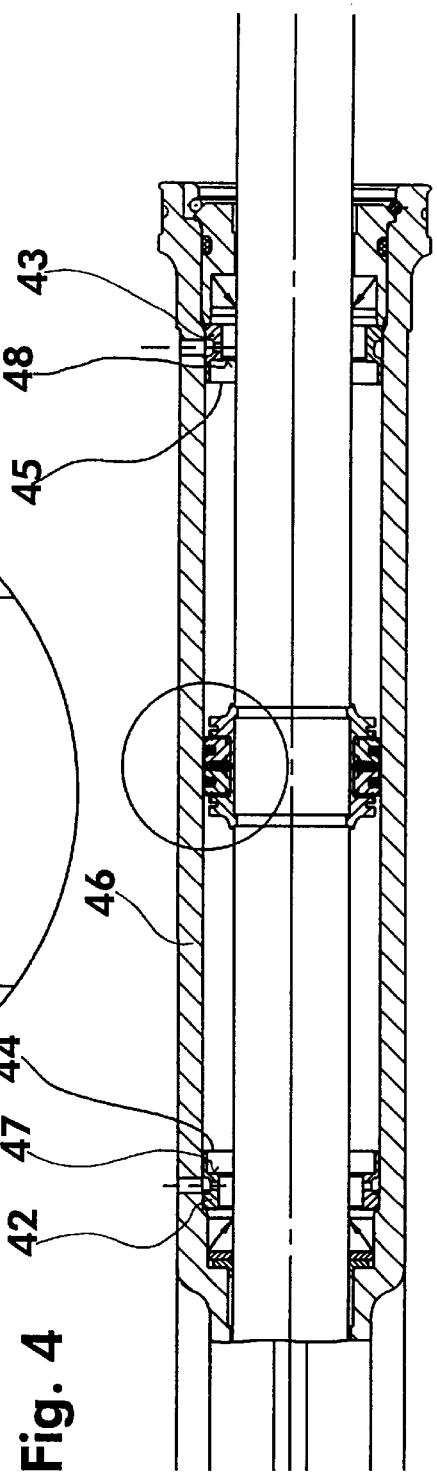
FIG. 4, enlarged detail of the working piston of FIG. 3.

FIGS. 3 and 4 show a further embodiment of the invention. A two-piece working piston 31 solidly connected to a piston rod 30 carries the idler pistons 32 and 33. The idler pistons 32, 33, with their outer face ends, provide sealing against the sealing edges 34 and 35. A bypass channel 36 can connect the pressure chambers 37 and 38 to one another, depending on the position of the idler pistons 32, 33. A chamber 40 is formed between the two idler pistons 32 and 33; it receives a spring 41, preferably a cup spring. The spring 41 presses the idler pistons 32 and 33 apart and keeps them in contact with the sealing edges 34 and 35 of the working piston 31. In the end positions, once again bushes 42 and 43 with offset collars 44 and 45 are press-fitted into the cylindrical tube 45 to act as stops.

In order for there to be no motion of the idler pistons 32, 33 with the attendant noise while the vehicle is driving straight ahead, the spring 41 is adapted to the working pressure and to the area of the end face of the moving pistons 32, 33. If the pressure in one of the pressure chambers 37 or 38 exceeds this working pressure, then the idler piston 32 or 33 is displaced counter to the spring 41, and via the opened sealing edge 34 or 35 a pressure builds up in the chamber 40. This pressure in the chamber 40, with the spring 41, re-establishes an equilibrium of force with the pressure in the pressure chambers 37 or 38. The idler piston is pressed by the spring 41 and by the pressure prevailing in the chamber 40 against the corresponding sealing edge 34 and 35 of the working piston 31.

The working piston 31 moves together with the idler pistons 32, 33, for instance to the right as a result of the working pressure in the pressure chamber 37. When the working piston 31 meets the limit stop 48 of the bush 43, the idler piston 33 is displaced by the collar 45, and the sealing edge 35 opens. The pressure in the chamber 40 thus comes to communicate with the return pressure of the pressure chamber 38 and is relieved to an oil container. As a result of the working pressure in the pressure chamber 37, the idler piston 32 is displaced counter to the spring 41 and to the return pressure in the chamber 40 and opens the sealing edge 34. Both idler pistons 32 and 33 have their sealing edges 34 and 35 open, and there is a short circuit between the pressure chambers 37 and 38 via the bypass channel 36. The oil pumped by a pump can flow out to a container the pressure in the pressure chamber 37 is established in accordance with the dimensioning of the spring 41. The working piston 31 with the idler pistons, 32, 33 is held in the end position by this pressure, which is below its maximum value.

Steering out of this end position can be done again with hydraulic support. If working pressure is fed into the pressure chamber 38 that until then had been relieved, the idler piston 32 seals off the pressure chamber 37 acted upon by return pressure and is pressed by the spring 41 against the sealing edge 34 of the working piston 31. Once the working piston 31 has left the limit stop 48 of the bush 43, the force ratio in the chamber 40 as described earlier above is reestablished, and the idler piston 33 closes the sealing edge 35.

What is claimed is:

1. A fluid control motor with end positions shutoff comprising:

a servo cylinder having two pressure chambers;

a working piston in said cylinder which separates said two pressure chambers and which has respective end positions in said cylinder, said working piston including a bypass channel connecting said two pressure chambers, and a respective sealing edge at respective opposite ends of said bypass channel;

an annular idler piston member located on said working piston and having respective end faces, said end faces being displaceable by a limited distance from associated said sealing edges, whereby during pressurization of one of said pressure chambers and relief of the other, a respective said face end of said idler piston seals against the associated said sealing edge and closes said bypass channel off from the other relieved said pressure chamber; and a respective bush at each end of said servo cylinder which presses said idler piston member as said working piston approaches an associated said end position during movement of said working piston in order to move the respective said face end away from the associated said sealing edge and thus to effect communication through said bypass channel between the pressurized and relieved said pressure chambers, which communication acts to shutoff movement of said working piston.

2. A fluid control motor as claimed in claim 1, wherein said idler piston member comprises:

two idler pistons, each said idler piston including one of said end faces and having limited displacement on said working piston, said two idler pistons forming a chamber therebetween which chamber is in fluid communication with a said pressure chamber when an associated said face seal is moved from engagement with the associated said sealing edge; and a spring located between said two idler pistons which urges both said end faces of said idler pistons into engagement with the associated said sealing edges.

3. A fluid control motor as claimed in claim 2, wherein said spring is a cup spring.

4. A fluid control motor as claimed in claim 2, wherein said bypass channel is an annular gap provided in said working piston.

5. A fluid control motor as claimed in claim 2, wherein each said bush comprises:

an offset stop collar with which an associated said idler piston is pressed as said working piston approaches the associated said end position; and an annular outside groove in fluid communication with a fluid connection of the control motor, said outside groove including a bore which communicates with the respective said pressure chamber.

6. A fluid control motor as claimed in claim 1:

wherein said idler piston member is a unitary idler piston; and wherein said working piston further includes respective control edges in said bypass channel which are respectively positioned to reduce a flow of fluid through said bypass channel and hence to dampen a meeting of an associated said end face of said idler piston with the associated said sealing edge.

7. A fluid control motor as claimed in claim 1, wherein said bypass channel is an annular gap provided in said working piston.

8. A fluid control motor as claimed in claim 1, wherein each said bush comprises:

an offset stop collar with which said idler piston member is pressed as said working piston approaches the associated said end position; and an annular outside groove in fluid communication with a fluid connection of the control motor, said outside groove including a bore which communicates with the respective said pressure chamber.

\* \* \* \* \*